United States Patent [19]

Conaway

[11] 4,282,632

[45] Aug. 11, 1981

[54] POULTRY PINNING AND DE-HAIRING MACHINE

[76] Inventor: Everett T. Conaway, Rte. 78, Bellfast, Seaford, Del. 19973

[21] Appl. No.: 92,889

[22] Filed: Nov. 9, 1979

[51] Int. Cl.³ .............................................. A22C 21/02
[52] U.S. Cl. ................................................ 17/11.1 R
[58] Field of Search ............................... 17/11.1 R, 47

[56] References Cited

U.S. PATENT DOCUMENTS

| | | | |
|---|---|---|---|
| 3,422,490 | 1/1969 | Zebarth et al. | 17/11.1 R X |
| 3,441,979 | 5/1969 | Masters | 17/11.1 R |
| 3,538,540 | 11/1970 | Hathorn | 17/11.1 R |
| 3,797,068 | 3/1974 | Dillon | 17/11.1 R |
| 3,959,850 | 6/1976 | Crane | 17/11.1 R |

*Primary Examiner*—Willie G. Abercrombie
*Attorney, Agent, or Firm*—Beveridge, DeGrandi, Kline & Lunsford

[57] ABSTRACT

Equipment for pinning and de-hairing poultry by free form inflect engagement therewith of a plurality of flexible fingers; elongated columnar members for supporting the flexible fingers; and a machine for rotatably supporting the elongated columnar members and the flexible fingers thereof for free form inflect engagement with poultry carcasses, as they move along a poultry processing line.

8 Claims, 6 Drawing Figures

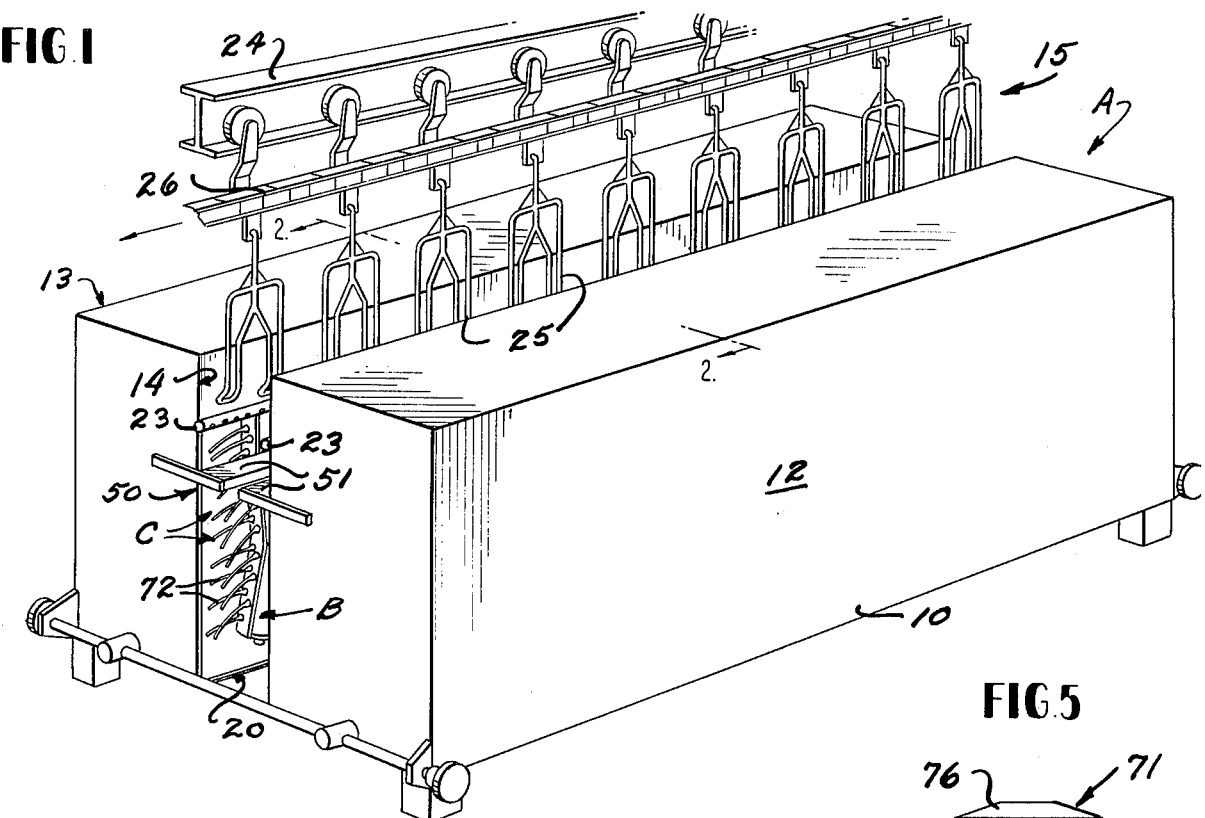
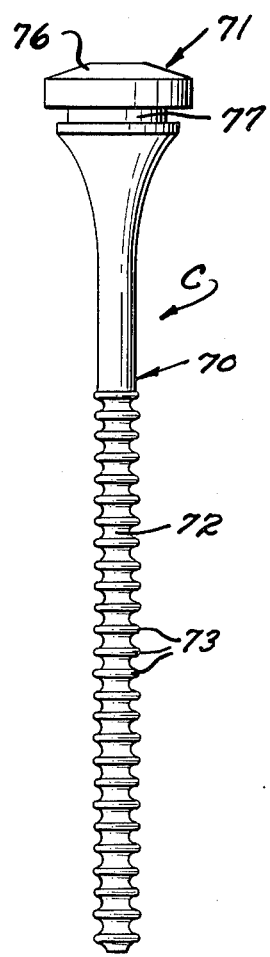
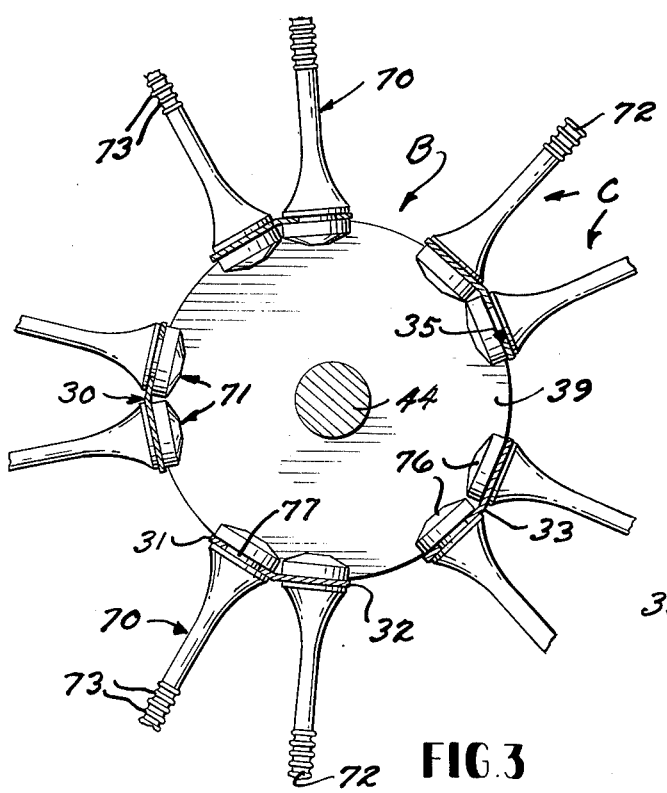

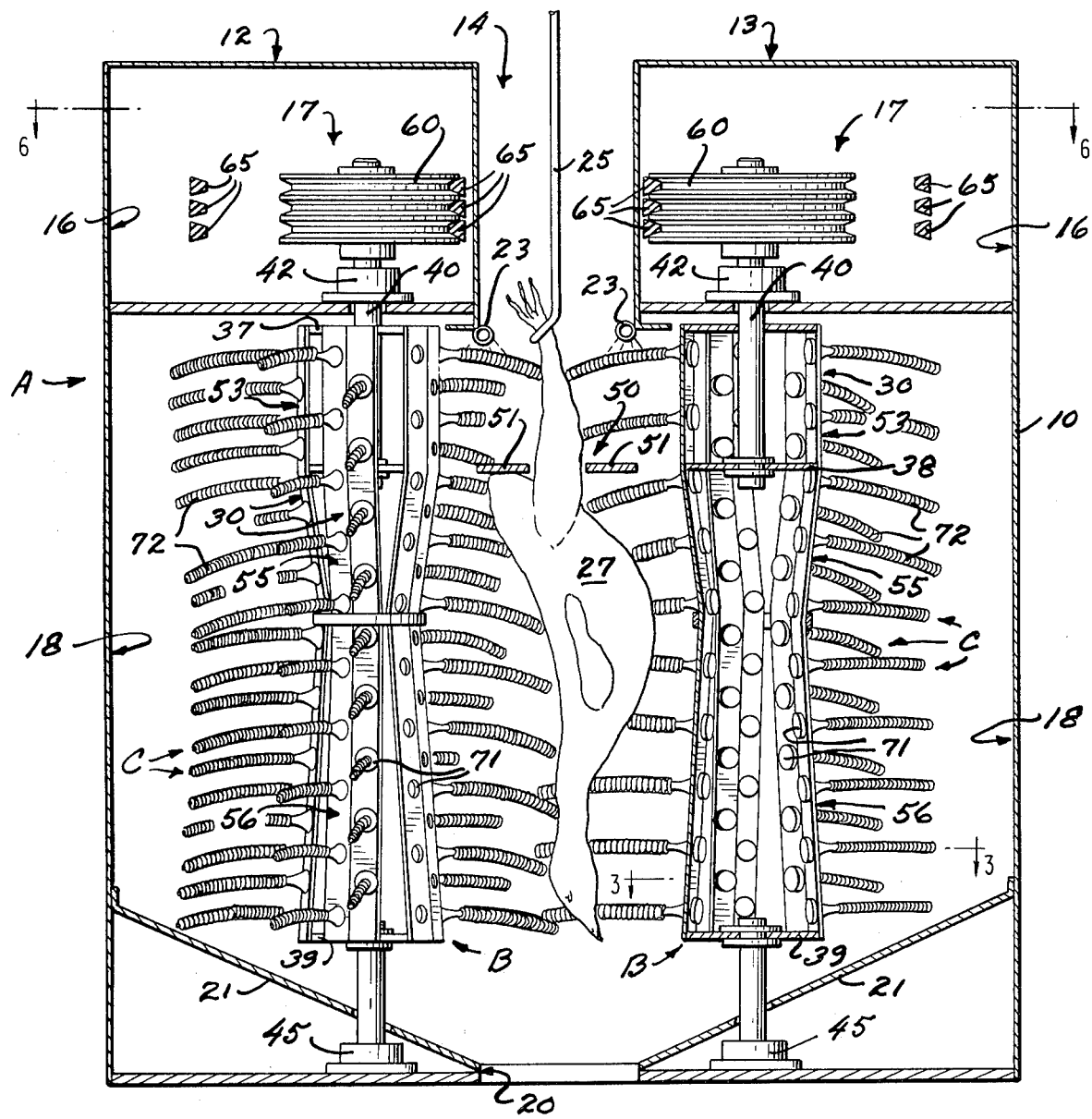
FIG. 2
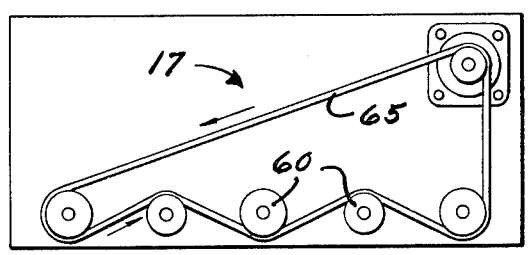
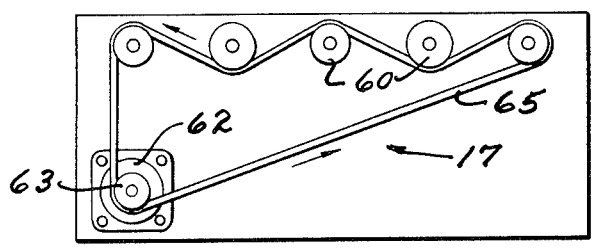
FIG. 6

POULTRY PINNING AND DE-HAIRING MACHINE

BRIEF BACKGROUND, FIELD AND OBJECTIVES OF THE INVENTION

This invention relates to improvements in equipment for pinning and de-hairing poultry.

After poultry has moved along the poultry processing line for removal of feathers, the next step is pinning and de-hairing. This is now generally accomplished by singeing the carcass over an open flame. In addition to the inherent danger to the processing employees working near the open flame, the poultry carcass is sometimes seared so as to be unusable as a food product, either in entirety, or as to certain parts thereof.

It is thus a primary object of this invention to provide a machine for the mechanical pinning and de-hairing of poultry, whereby to eliminate the danger and waste of the singeing process presently employed to this end.

A further object is the provision of elongated flexible fingers of a configuration for facile pinning and de-hairing of poultry.

A still further object is the provision of means for supporting such elongated flexible fingers in a manner to facilitate free form inflect engagement thereof with various parts of a poultry carcass.

Other objects and advantages of the invention will become apparent from the following detailed description, taken in connection with the accompanying drawings, and in which drawings:

BRIEF DESCRIPTION OF THE DRAWINGS

FIG. 1 is a perspective view of my improved poultry pinning and de-hairing machine.

FIG. 2 is an enlarged transverse sectional view thereof, taken substantially along the line 2—2 of FIG. 1.

FIG. 3 is an enlarged fragmentary sectional view of an elongated columnar member thereof taken substantially on the line 3—3 of FIG. 2.

FIG. 4 is a plan view of a plate member of the elongated columnar member of FIG. 3.

FIG. 5 is a plan view of an elongated flexible finger of my invention.

FIG. 6 is a somewhat diagrammatic view of the means for rotation of the elongated columnar members of my invention.

DETAILED DESCRIPTION

In the drawings, wherein is shown a preferred embodiment of the invention, and wherein similar reference characters designate corresponding parts throughout the several views, the letter A may generally designate my improved pinning and de-hairing machine, having elongated columnar members B which support elongated flexible fingers C.

My improved poultry pinning and de-hairing machine A preferably includes a frame 10, having two side portions, 12 and 13, which define an elongated passageway 14 therebetween and through which the poultry of a poultry processing line 15 may move, each side thereof including an upper housing 16 for receiving drive means 17 for rotation of elongated columnar members B, and a lower housing 18 within which elongated columnar members B may be rotatably supported.

Side portions 12 and 13 may also define an elongated dischargeway 20 therebetween at the bottom thereof, through which waste from the pinning and de-hairing process may be discharged, a pan 21 being provided adjacent the bottom of each housing 18 and angled toward dischargeway 20 to facilitate discharge therefrom of such waste, and a pipe 23 being mounted adjacent the top of each housing 18 for spraying water thereinto in cleaning waste material therefrom.

Poultry processing line 15 may comprise any suitable equipment for moving poultry through the various steps in preparing the same for marketing as a food product. As shown, the same may include a guideway for supporting a plurality of poultry shackles 25, which may be moved therealong by such as an endless chain 26. A poultry carcass 27 may be suspended from each shackle 25, as shown in FIG. 2.

Elongated columnar members B provide means for rotatably supporting elongated flexible fingers C in juxtaposition for free form inflect engagement with a poultry carcass as it moves through passageway 14.

As shown, each elongated columnar member B may comprise a plurality of elongated plate members 30, each of which may have elongated side portions 31 and 32 which are slightly angled toward one another, along the center line 33 thereof, as best shown in FIGS. 3 and 4. Each of the side portions 31 and 32 thereof may be provided with a plurality of apertures 35 spaced along the length thereof, the apertures 35 of one side portion being in a staggered relation to those of the other side portion thereof, as best shown in FIG. 4.

Plate members 30 may have the upper end thereof interconnected about the periphery of a substantially cylindrical sub-frame or disc 37, the lower end thereof interconnected about the periphery of a substantially cylindrical sub-frame 39, and may be intermediately interconnected about the periphery of a substantially cylindrical sub-frame or disc 38.

A shaft 40 may be interconnected to discs 37 and 38 and journaled within a bearing 42 mounted on the upper portion of frame 10; and a shaft 44 may be interconnected to disc 39 and journaled within a bearing 45 mounted on the lower portion of frame 10, by way of rotatably supporting elongated columnar members B within the housing 18 of each side 12 and 13, to each side of passageway 14 and in a spaced apart confronting relation, as best shown in FIG. 6, so that the path of rotation of the free ends of elongated flexible fingers C supported by one elongated columnar member B overlap the path of rotation of the free ends of the elongated flexible fingers C supported by the elongated columnar member B which confronts the same.

I have found that the poultry carcass 27 is best positioned for inflect engagement of parts thereof by flexible fingers C if the poultry carcass is slightly canted toward one side, such as by guide means 50. Guide means 50 may comprise an elongated bar 51, attached to frame 10 and extending therealong to one side of passageway 14 thereof at a location to engage against the butt end of the poultry carcass 27 and to thereby cant the breast thereof toward the elongated columnar members B to one side thereof. Since my poultry pinning and de-hairing machine may be used in various poultry processing lines in which the line of movement of poultry therealong is in the direction opposite that shown in the drawings, the shackles thereof may be reversed, or poultry hung in the shackles opposite to that intended, guide means 50 preferably includes a bar 51 to each side of passageway 14 so that regardless of the side to which the breast of a poultry carcass may be facing, the same will be canted toward the elongated columnar members to one side of frame 10.

In addition to being vertically angled along the center line 33, as previously described, plate members 30 are preferably horizontally angled at a location spaced apart from the upper end thereof which is substantially opposite guide means 50, to provide elongated columnar members B with a generally cylindroidal upper portion 53 at the lowermost reaches of which may be mounted disc 38; and are preferably horizontally angled toward one another at a location intermediate cylindroidal portion 53 and the lower portion thereof, to provide a central portion 55 of an inverted generally frusto-conical configuration depending from and below cylindroidal portion 53 thereof, and a lower portion 56 of a generally right frusto-conical configuration. A band 58 may be provided about plate members 30 at the area of adjoinment of the frustum of the central portion 55 with the frustum of the lower portion 56 thereof.

I have found that the above-described canting of the poultry carcass and the confronting relation and vertical configuration of columnar members B facilitates pinning and de-hairing of the poultry carcass 27. However, it is within the scope of this invention to otherwise position the poultry carcass as it moves through my machine and that columnar members B may be otherwise positioned and configured, for instance, with the poultry carcasses freely hanging, columnar members B disposed to each side of passageway 14 in other than a confronting relation, and with columnar members B otherwise configured and constructed, such as by way of comprising a tubular one-piece member.

Pulley means 60 may be interconnected to shaft 40 of each columnar member 30 as a part of the drive means 17 for rotation thereof. The drive means for each side 12 and 13 thereof may also include a drive motor 62 having a drive pulley 63, belt means 65 being entrained about drive pulley 63 and each pulley means 60 of each columnar member B thereof.

As shown, the pulley means 60 of alternate columnar members B to one side of frame 10 are preferably of different diameters, so that each columnar member B is rotated at either a faster or slower rate than the columnar member or members B next adjacent thereto. Also, the pulley means of confronting columnar members B to each side of passageway 14 are preferably of different diameters, so that the columnar member B to one side thereof is rotated at either a faster or slower rate than the confronting columnar member B on the other side thereof.

Flexible fingers C are preferably of one-piece construction, and may comprise an elongated flexible shaft 70 having mounting means 71 at one end thereof. Shaft 70 may comprise an elongated shank portion 72 provided with a plurality of spaced apart coil means 73 therealong defining ripple means for free form inflect engagement with poultry carcass 27. As shown, coil means 73 may comprise a plurality of spaced apart discs which are of a greater diameter than shank portion 72.

Mounting means 71 may comprise an enlarged head portion 76 having a gullet 77 for interfitting within apertures 35 of each plate member 30.

Flexible fingers C are mounted on columnar members B with the shank portion 72 thereof extendant outwardly therefrom, in a generally horizontal direction, for free form rotational movement of shank portion 72 thereof on rotation of columnar members B.

Various changes may be made in the form of the invention as herein shown and described without departing from the spirit of the invention or the scope of the following claims.

I claim:

1. An elongated columnar member for supporting a plurality of poultry pinning and de-hairing flexible fingers, said elongated columnar member having a plurality of attaching means for receiving said flexible fingers in spaced apart relation therealong and extendant outwardly from the periphery thereof and including a generally cylindroidal upper portion for mounting of said fingers thereon in juxtaposition for free form inflect engagement with the leg area of a poultry carcass, a central portion extendant from said upper portion, said central portion being generally of an inverted frusto-conical configuration for mounting of said fingers thereon for free form inflect engagement with the breast, back and flanks of a poultry carcass adjacent the hock area thereof, and a lower portion extendant from said central portion, said lower portion being generally of a right frusto-conical configuration for mounting of said fingers thereon for free form inflect engagement with the neck, wings, breast, back and flank of a poultry carcass in the shoulder area thereof, said elongated columnar member comprising a plurality of elongated plate members, each of said plate members having elongated side portions at an angle to each other along the center line of said plate members, and substantially cylindrical sub-frame means, said plate members being attached about the periphery of said substantially cylindrical sub-frame members to define the periphery of said elongated columnar member.

2. An elongated columnar member as specified in claim 1 wherein said attaching means comprises a plurality of spaced apart apertures juxtaposed in a staggered relationship longitudinally along said plate members.

3. A poultry pinning and de-hairing machine including a frame defining a passageway for receiving poultry of a poultry processing line moving therethrough; a plurality of elongated columnar members rotatably mounted on said frame, to each side of said passageway; means for rotation of said elongated columnar members; and a plurality of elongated flexible fingers mounted on each said elongated columnar members for free form inflect engagement with a poultry carcass moving through said passageway thereof, each said elongated columnar members including a plurality of attaching means for receiving said flexible fingers in spaced apart relation therealong and extendant outwardly from the periphery thereof and including a generally cylindroidal upper portion for mounting of said fingers thereon in juxtaposition for free form inflect engagement with the leg area of a poultry carcass, a central portion extendant from said upper portion, said central portion being generally of an inverted frusto-conical configuration for mounting of said fingers thereof for free form inflect engagement with the breast, back and flanks of a poultry carcass adjacent the hock area thereof, and a lower portion extendant from said central portion, said lower portion being generally of a right frusto-conical configuration for mounting of said fingers thereon for free form inflect engagement with the neck, wings, breast, back and flanks of a poultry carcass in the shoulder area thereof, the frustum of said central portion adjoining with the frustum of said lower portion in the general area of the greatest girth of a poultry carcass being treated by said fingers attached thereto, each said elongated columnar members comprising a plurality of elongated plate members, each of said plate members having elongated side portions at an angle to each other along the center line of said plate members, and substantially cylindrical sub-frame means, said plate members being attached about the periphery of said substantially cylindrical sub-frame members in juxtaposition with said plate members to define the periphery of said elongated columnar member.

4. A poultry pinning and de-hairing machine as specified in claim 3 wherein said attaching means comprises a plurality of spaced apart apertures juxtaposed in a staggered relationship longitudinally along said plate members.

5. A poultry pinning and de-hairing machine as specified in either of claims 1, 2, 3 or 4 wherein said frame includes guide means attached thereto for engagement with poultry moving therethrough in juxtaposed relationship to cant the same toward one side of said passageway.

6. A poultry pinning and de-hairing machine including a frame defining a passageway for receiving poultry of a poultry processing line moving therethrough; a plurality of elongated columnar members rotatably mounted on said frame, to each side of said passageway; means for rotation of said elongated columnar members; a plurality of elongated flexible fingers mounted on each said elongated columnar members for free form inflect engagement with a poultry carcass moving through said passageway thereof; and guide means mounted on said frame for engagement with poultry moving therethrough in juxtaposed relationship to cant the same toward one side of said passageway.

7. A poultry pinning and de-hairing machine as specified in either of claims 3, 4, or 6 wherein said elongated columnar members on one side of said passageway confront said elongated columnar members to the other side thereof, and said means for rotation of said elongated columnar members includes means for rotation of each of said elongated columnar members on one side of said passageway in the opposite direction from that next adjacent thereto and in the opposite direction from that confronting the same to the other side of said passageway.

8. A poultry pinning and de-hairing machine as specified in claim 7 wherein said means for rotation of said elongated columnar members includes means for rotation of alternate ones of said elongated columnar members on one side of said passageway at a speed of rotation which differs from the one next adjacent thereto.

* * * * *